US009425018B2

(12) United States Patent
Nohara

(10) Patent No.: US 9,425,018 B2
(45) Date of Patent: Aug. 23, 2016

(54) FUSE UNIT

(75) Inventor: Mami Nohara, Shizuoka-ken (JP)

(73) Assignee: YAZAKI CORPORATION, Tokyo (JP)

( * ) Notice: Subject to any disclaimer, the term of this patent is extended or adjusted under 35 U.S.C. 154(b) by 111 days.

(21) Appl. No.: 13/357,904

(22) Filed: Jan. 25, 2012

(65) Prior Publication Data

US 2012/0188050 A1    Jul. 26, 2012

(30) Foreign Application Priority Data

Jan. 26, 2011    (JP) ................ P2011-013983

(51) Int. Cl.
*H01H 85/00*    (2006.01)
*H01H 85/20*    (2006.01)

(52) U.S. Cl.
CPC .......... *H01H 85/201* (2013.01); *H01H 85/006* (2013.01); *H01H 2085/208* (2013.01)

(58) Field of Classification Search
CPC ............. H01H 85/201; H01H 85/006; H01H 2085/208
USPC ................ 337/159, 161, 186–188, 227, 283; 361/626, 833; 439/754, 761, 762, 893, 439/620.26, 620.27; 320/154
See application file for complete search history.

(56) References Cited

U.S. PATENT DOCUMENTS

| 4,782,240 | A | * | 11/1988 | Davidson ...................... 307/10.7 |
| 5,438,310 | A | * | 8/1995 | Ikari .............................. 337/208 |
| 5,643,693 | A | * | 7/1997 | Hill et al. ...................... 429/121 |
| 5,645,448 | A | * | 7/1997 | Hill ............................... 439/522 |
| 5,805,047 | A | * | 9/1998 | De Villeroche et al. ...... 337/290 |
| 5,882,213 | A | * | 3/1999 | Witek et al. .................. 439/76.2 |
| 5,886,611 | A | * | 3/1999 | Schaller et al. .............. 337/189 |
| 6,162,098 | A | * | 12/2000 | Cheng et al. ............. 439/620.29 |
| 6,222,439 | B1 | * | 4/2001 | Tanigawa et al. ............ 337/401 |
| 6,294,978 | B1 | * | 9/2001 | Endo et al. .................... 337/166 |
| 6,398,595 | B2 | * | 6/2002 | Wakata et al. ................ 439/755 |
| 6,509,824 | B2 | * | 1/2003 | Inaba et al. ................... 337/295 |
| 6,512,443 | B1 | * | 1/2003 | Matsumura et al. ......... 337/189 |
| 6,576,838 | B2 | * | 6/2003 | Matsumura ..................... 174/66 |
| 6,723,920 | B2 | * | 4/2004 | Higuchi et al. ................. 174/50 |
| 6,737,578 | B2 | * | 5/2004 | Higuchi .......................... 174/50 |
| 6,793,534 | B2 | * | 9/2004 | Cheng et al. ............. 439/620.04 |
| 6,806,421 | B2 | * | 10/2004 | Matsumura ..................... 174/50 |

(Continued)

FOREIGN PATENT DOCUMENTS

| JP | H10223125 A | | 8/1998 | |
| JP | 2004185965 A | * | 7/2004 | .............. H01M 2/30 |

(Continued)

OTHER PUBLICATIONS

Office Action from the German Patent Office relating to Patent Application No. 10 2012 100 572.9, dated Nov. 21, 2014 (German and English-translation (10 pgs.)).

*Primary Examiner* — Anatoly Vortman
(74) *Attorney, Agent, or Firm* — Sughrue Mion, PLLC

(57) ABSTRACT

A fuse unit includes a unit body and an auxiliary fuse unit. The unit body includes a bus bar provided with a power supply connector, first output connectors and second output connectors and fusible members, and an insulation protector provided on the periphery of the bus bar. The auxiliary fuse unit includes an auxiliary bus bar provided with an auxiliary power supply connector and an auxiliary output connector and is detachably installed to the unit body.

2 Claims, 6 Drawing Sheets

(56) References Cited

U.S. PATENT DOCUMENTS

| | | | |
|---|---|---|---|
| 6,817,907 B2 * | 11/2004 | Cheng et al. | 439/754 |
| 6,828,058 B2 * | 12/2004 | Matsumura et al. | 429/65 |
| 6,902,434 B2 * | 6/2005 | Stack | 439/620.28 |
| 6,948,982 B2 * | 9/2005 | Higuchi et al. | 439/620.26 |
| 7,176,780 B2 * | 2/2007 | Iwata | 337/188 |
| 7,420,453 B2 * | 9/2008 | Matsumura et al. | 337/295 |
| 7,592,892 B2 * | 9/2009 | Ito et al. | 337/159 |
| 7,663,465 B2 * | 2/2010 | Matsumoto et al. | 337/187 |
| 7,663,466 B1 * | 2/2010 | Jetton | 337/191 |
| 7,978,046 B2 * | 7/2011 | Ohashi et al. | 337/186 |
| 2001/0011939 A1 * | 8/2001 | Inaba et al. | 337/265 |
| 2005/0116807 A1 | 6/2005 | Nojima et al. | |

FOREIGN PATENT DOCUMENTS

| | | |
|---|---|---|
| JP | 2005116309 A | 4/2005 |
| JP | 2005-310710 | 11/2005 |
| JP | 2006313686 A | 11/2006 |
| JP | 2007-087823 | 4/2007 |
| JP | 2010-192329 | 9/2010 |

* cited by examiner

FUSE UNIT

CROSS REFERENCE TO RELATED APPLICATION

This application claims benefit of priority under 35 U.S.C. §119 to Japanese Patent Application No. 2011-013983, filed on Jan. 26, 2011, the entire contents of which are incorporated by reference herein.

BACKGROUND OF THE INVENTION

1. Field of the Invention

The present invention relates to a fuse unit.

2. Description of the Related Art

Patent Document 1 (Japanese Patent Application Laid-open Publication No. 2010-192329) discloses one of the conventional fuse units. A fuse unit 100 shown in FIG. 1 is a so-called direct-fitting fuse unit that is directly fixed to a battery 101. The fuse unit 100 is fixed to a battery post 102 of the battery 101 via a battery connection terminal 103. The fuse unit 100 includes a bus bar 110 which is an electrically conductive metal plate, and an insulation protector 120 formed by insert resin molding provided on the periphery of the bus bar 110.

The bus bar 110 includes a power supply connector 111 connected to the battery connection terminal 103 and supplied with power from the battery post 102, an output connector 112 connected to a load terminal 130, and a fusible member (not shown in the figure) located between the power supply connector 111 and the output connector 112. A screw hole 112a is put in the output connector 112. A stud bolt 113 is screwed into the screw hole 112a. The stud bolt 113 has electrical conductivity, and is provided with threaded portions at both ends thereof. The load terminal 130 of a wire harness side is connected to the output connector 112 via the stud bolt 113.

The insulation protector 120 covers the periphery of the bus bar 110 excluding the areas of the connectors 111 and 112 and the fusible member (not shown in the figure).

According to this conventional case, both sides (top side and back side) of the fuse unit 100 are available for the fixation to the battery post 102 so as to deal with changes in vehicular conditions (for example, positional changes of steering wheels between the right and the left).

However, in a case where a new circuit is added to the fuse unit 100 due to changes in vehicular conditions, a new mold is necessarily prepared to deal with the increase in circuits in the conventional fuse unit 100.

SUMMARY OF THE INVENTION

It is an object of the present invention to provide a fuse unit capable of dealing with the increase in circuits without preparing a new mold.

A fuse unit according to the present invention includes a unit body including a bus bar provided with a power supply connector, an output connector and a fusible member, and an insulation protector provided on a periphery of the bus bar; and an auxiliary fuse unit including an auxiliary bus bar provided with an auxiliary power supply connector and an auxiliary output connector and detachably installed to the unit body.

The auxiliary fuse unit is preferably installed in the unit body in such a manner that the power supply connector and the auxiliary power supply connector are fastened together, and respective fitting portions of the unit body and the auxiliary fuse unit are fitted together.

The fitting portion of the unit body is preferably provided with protrusions for heat release, and the fitting portion of the auxiliary fuse unit is preferably provided with concave portions into which the protrusions are inserted.

The unit body is preferably fixed to a battery along an upper surface and a side surface of the battery, and the auxiliary fuse unit is preferably installed on an upper surface of the unit body.

According to the present invention, in a case where a new circuit is added to be connected to the fuse unit due to changes in vehicular conditions, the auxiliary fuse unit is installed to unit body to deal with the increase in circuits, which can deal with the increase in circuits without preparing a new mold.

DESCRIPTION OF THE EMBODIMENTS

Hereinafter, a description will be made below of an embodiment of the present invention with reference to the drawings.

Figure 1:
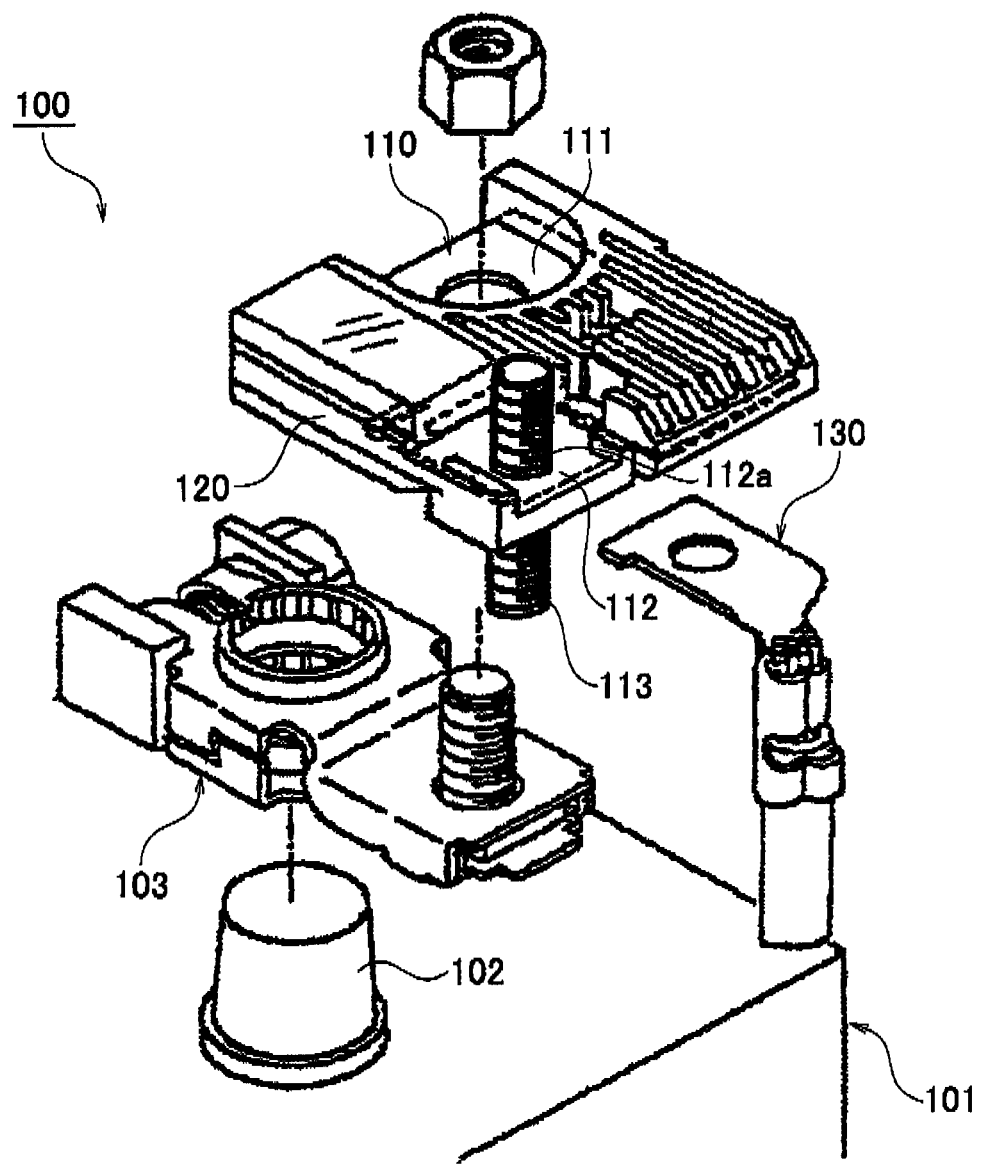
FIG. 1 is a perspective view of a conventional fuse unit.
Figure 2:
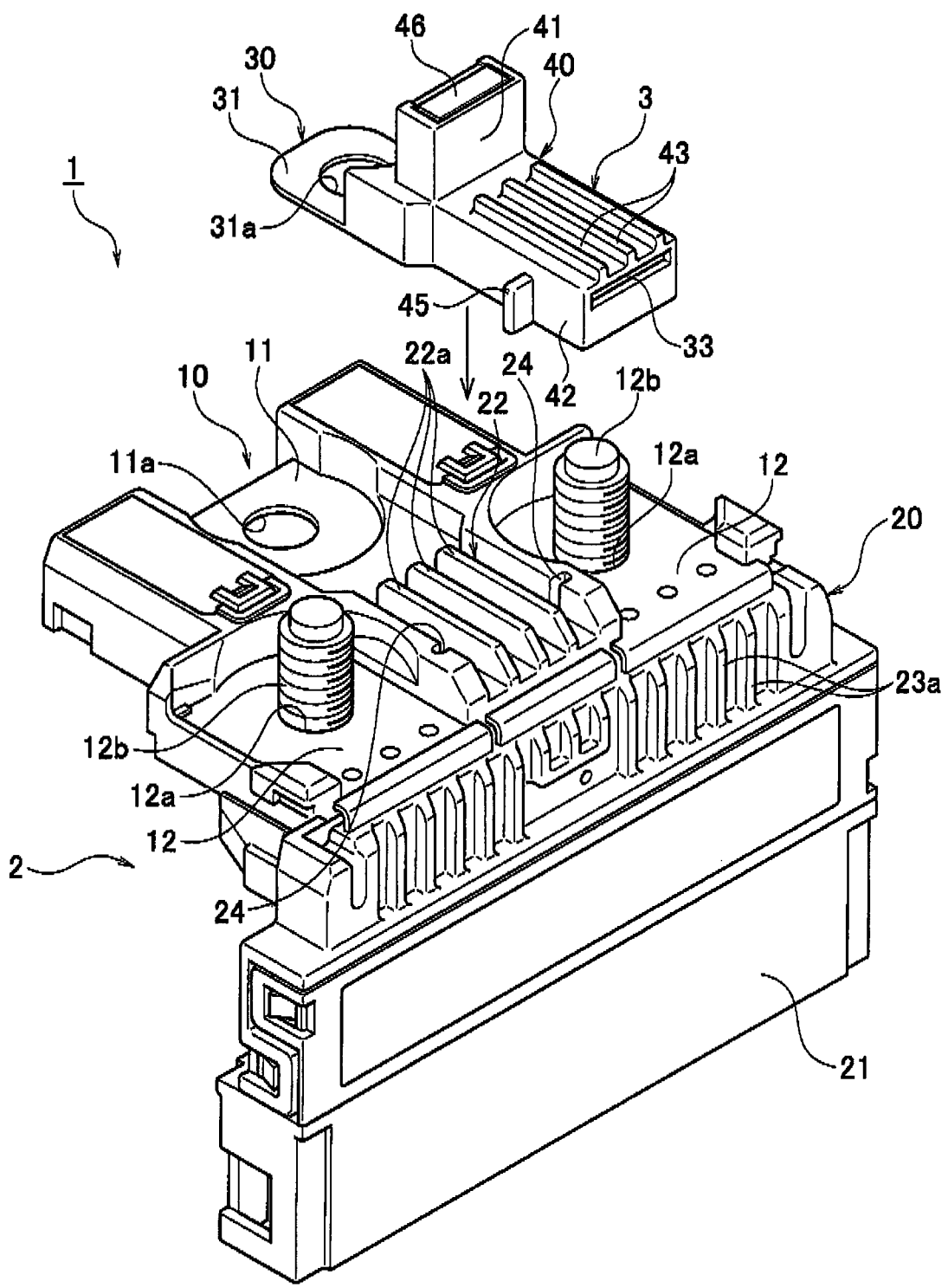
FIG. 2 is a perspective view of a fuse unit before the installation of an auxiliary fuse unit according to an embodiment of the present invention.
Figure 3:
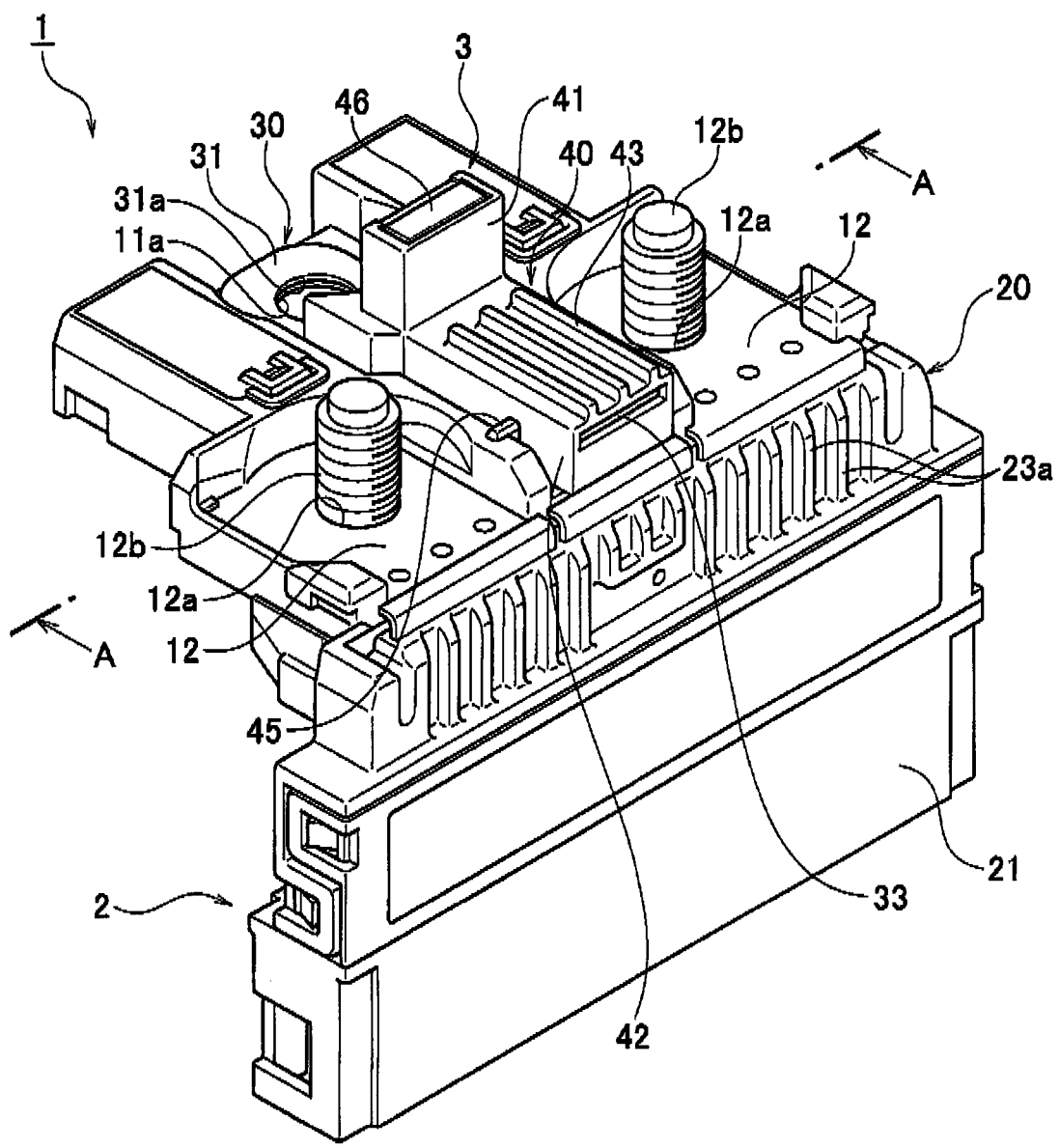
FIG. 3 is a perspective view of a fuse unit to which an auxiliary fuse unit is installed according to the embodiment of the present invention.

FIGS. 2 to 6 show one embodiment of the present invention. As shown in FIGS. 2 and 3, a fuse unit 1 includes a unit body 2 fixed to a battery post (not shown in the figures) of a battery (not shown in the figures) via a battery connection terminal (not shown in the figures). An auxiliary fuse unit 3 is installed to the unit body 2. Following is an explanation thereof.

The unit body 2 includes a bus bar 10 which is an electrically conductive metal plate, and an insulation protector 20 formed by insertion resin molding provided on the periphery of the bus bar 10.

The bus bar 10 includes a power supply connector 11 supplied with power via the battery connection terminal (not shown in the figures) from the battery post, first output connectors 12 and second output connectors (not shown in the figures) connected to the other terminals such as load terminals, and fusible members (not shown in the figures) located between the power supply connector 11 and the first output connectors 12 and between the supply connector 11 and the second output connectors (not shown in the figures), respectively. A bolt insertion hole 11a is put in the power supply connector 11.

A bolt insertion hole 12a is put in each first output connector 12. A stud bolt 12b is inserted into each bolt insertion hole 12a. The head of each inserted stud bolt 12b is fixed by the insulation protector 20. Each second output connector (not shown in the figures) is formed into a shape of a tab terminal.

The insulation protector 20 is provided to cover the periphery of the bus bar 10 excluding the areas of the power supply connector 11, the first output connectors 12, the second output connectors (not shown in the figures) and the fusible members (not shown in the figures). The insulation protector 20 is provided with a connector housing 21 formed to surround the periphery of each second output connector (not shown in the figures). The insulation protector 20 is also provided with a fitting portion 22 on the upper surface thereof. The fitting portion 22 is provided with plural protrusions 22a aligned parallel to each other. The insulation protector 20 is provided with plural protrusions 23a on the side surface thereof aligned parallel to each other. The respective protrusions 22a and 23a effectively release heat from the bus bar 10 outward. That is, the fitting portion 22 is provided to utilize the protrusions 22a for heat release. In addition, a pair of positioning grooves 24 is formed at the respective outermost protrusions 22a provided on the upper surface of the insulation protector 20.

Figure 4:
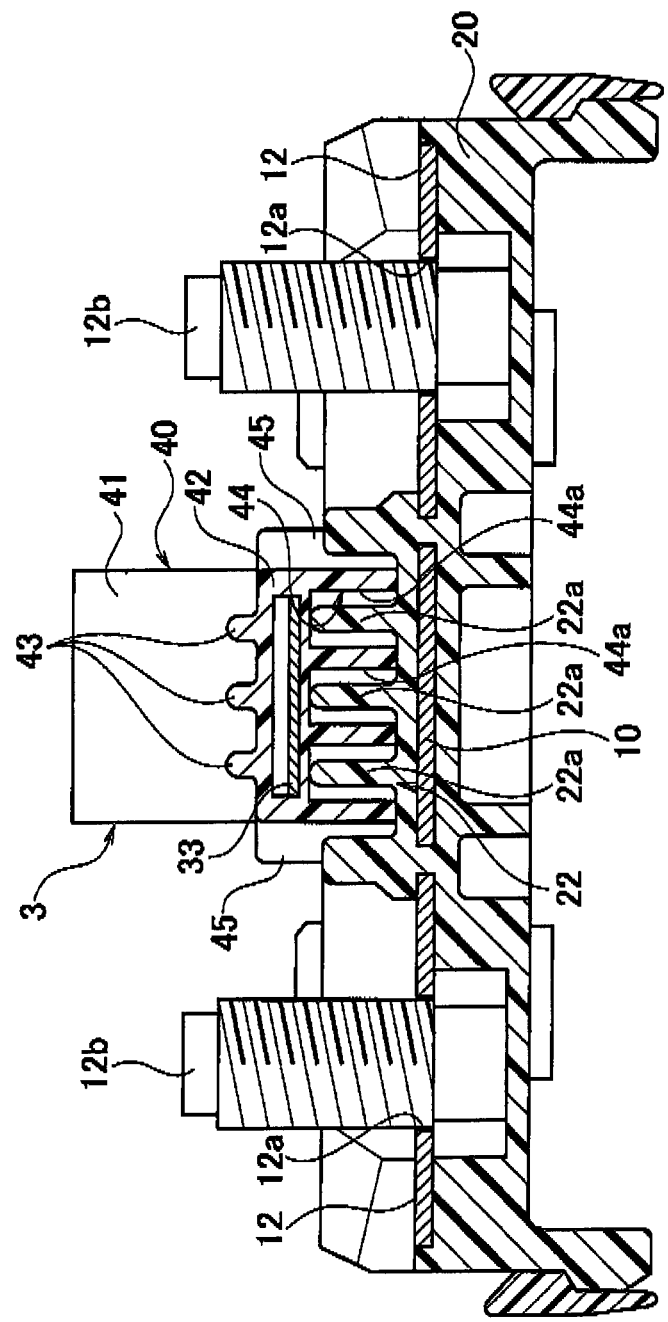
FIG. 4 is a cross-sectional view taken along the line A-A in FIG. 3 according to the embodiment of the present invention.
Figure 5A:
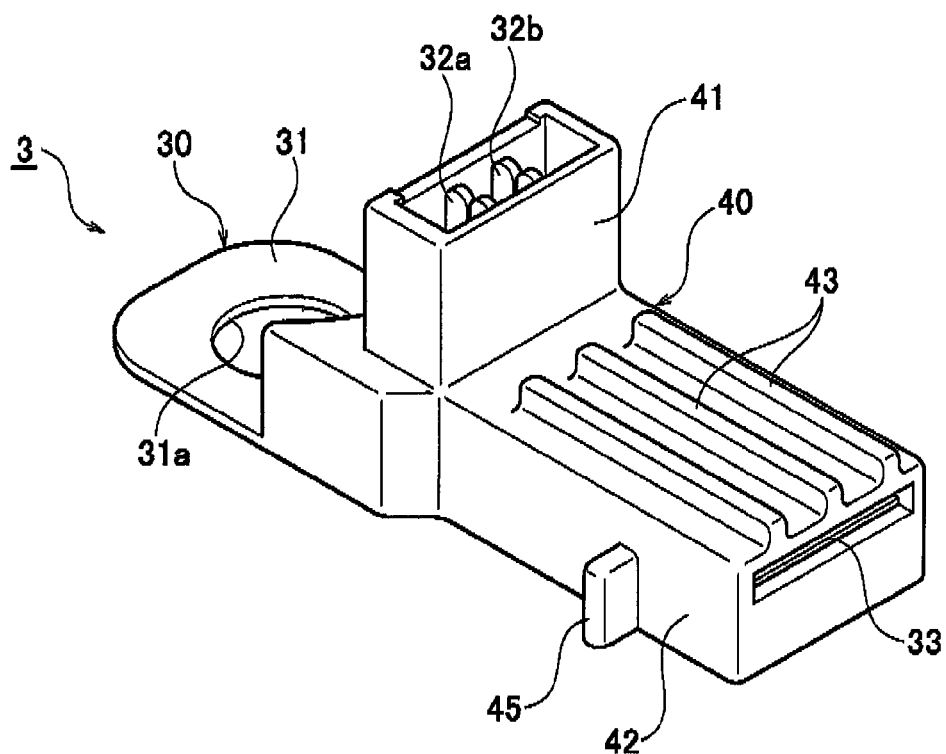
FIG. 5A is a perspective view of an auxiliary fuse unit viewed from the upper side according to the embodiment of the present invention.
Figure 5B:
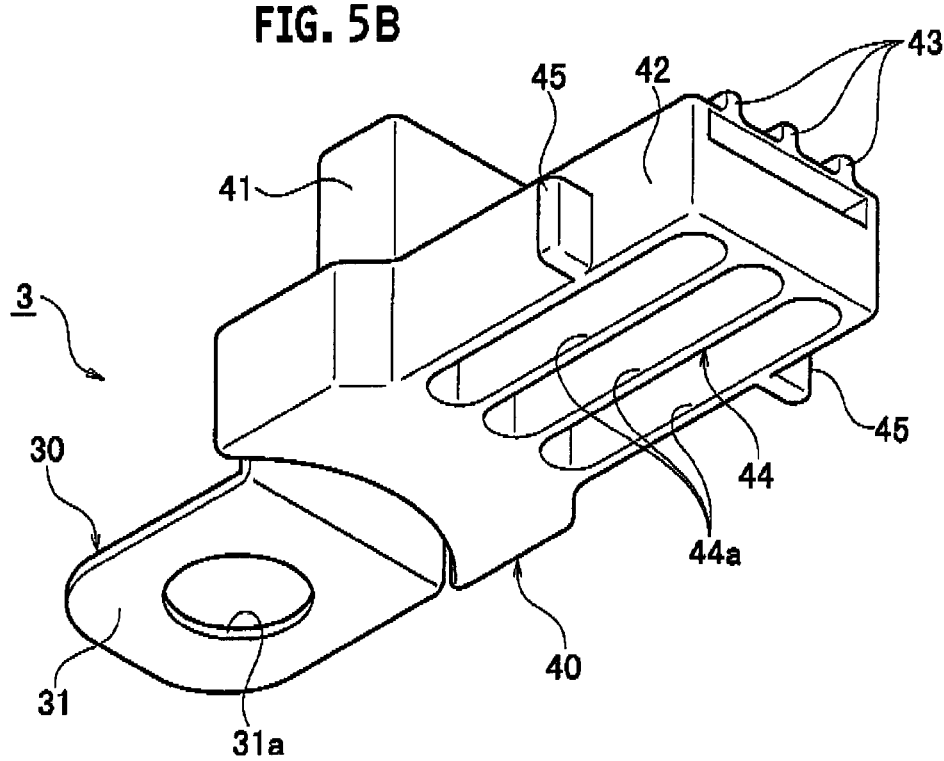
FIG. 5B is a perspective view of an auxiliary fuse unit viewed from the bottom side according to the embodiment of the present invention.
Figure 6:
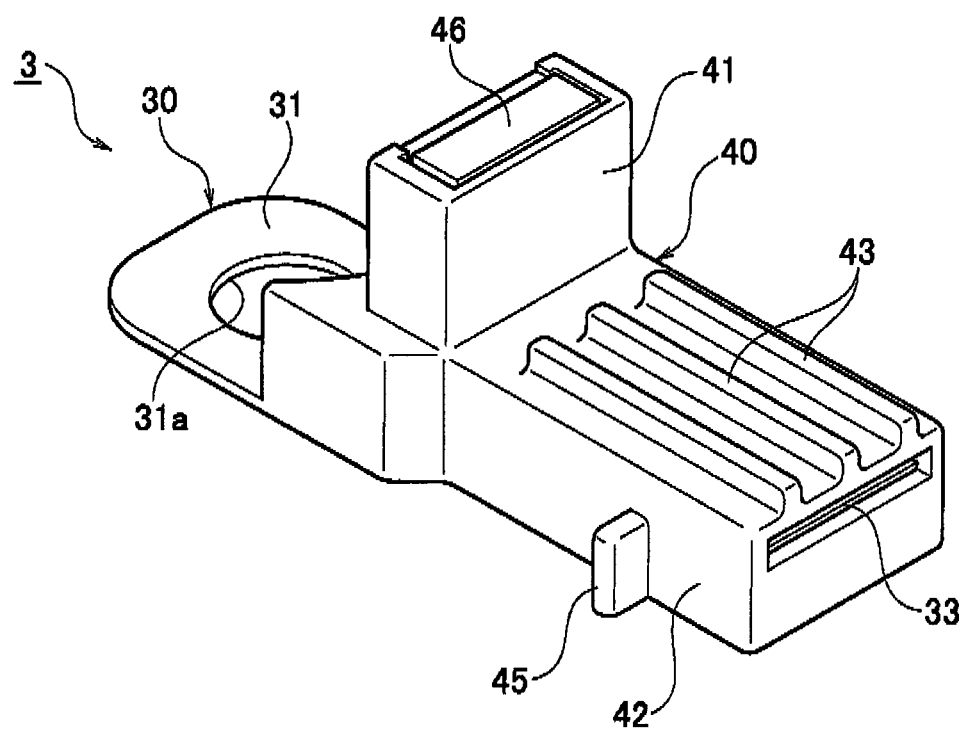
FIG. 6 is a perspective view of an auxiliary fuse unit in which a fuse is installed according to the embodiment of the present invention.

The auxiliary fuse unit 3 includes an auxiliary bus bar 30, and an auxiliary insulation protector 40 formed by insertion resin molding provided on the periphery of the auxiliary bus bar 30, as specifically shown in FIGS. 4 to 6.

The auxiliary bus bar 30 is made of an electrically conductive metal plate thinner than the bus bar 10 of the unit body 2. Thus, the auxiliary bus bar 30 is provided with a circuit having a smaller rating than that in the unit body 2. The auxiliary bus bar 30 is divided into two members. One of the divided members of the auxiliary bus bar 30 is provided with an auxiliary power supply connector 31 and a fuse connection terminal 32a. The other divided member of the auxiliary bus bar 30 is provided with an auxiliary output connector 33 and another fuse connection terminal 32b.

A bolt insertion hole 31a is put in the auxiliary power supply connector 31. The auxiliary output connector 33 is formed into a shape of a tab terminal. The two fuse connection terminals 32a and 32b are a pair of turning fork terminals located to face each other.

The auxiliary insulation protector 40 is formed to cover the periphery of the auxiliary bus bar 30 excluding the area of the auxiliary power supply connector 31. The auxiliary insulation protector 40 is provided with a connector housing 41 formed to surround the periphery of the pair of the fuse connection terminals 32a and 32b. A cartridge type fuse 46 can be installed in the connector housing 41. The auxiliary insulation protector 40 is also provided with a connector housing 42 formed to surround the periphery of the auxiliary output connector 33. A load terminal (not shown in the figures) provided with an additional circuit is installed in the connector housing 42. The connector housing 42 of the auxiliary insulation protector 40 is provided with plural protrusions 43 on the upper surface thereof aligned parallel to each other. The respective protrusions 43 effectively release heat from the auxiliary bus bar 30 outward.

The connector housing 42 of the auxiliary insulation protector 40 is provided with a fitting portion 44 formed on the bottom surface thereof at a side of the auxiliary fuse unit 3. The fitting portion 44 is provided with plural concave portions 44a aligned parallel to each other.

A pair of positioning protrusions 45 is formed at the side surfaces of the connector housing 42 of the auxiliary insulation protector 40.

In a case where a new circuit is added to be connected to the fuse unit 1 due to changes in vehicular conditions in the above-described configuration, the auxiliary fuse unit 3 is installed to the unit body 2.

In particular, the auxiliary power supply connector 31 and the fitting portion 44 of the auxiliary fuse unit 3 together with the power supply connector 11 and the fitting portion 22 of the unit body 2 are positioned in such a manner that the positioning protrusions 45 are inserted into the positioning grooves 24 to fit the protrusions 22a into the concave portions 44a. Thus, the auxiliary fuse unit 3 and the unit body 2 are temporarily fitted together. In the temporary fitting state, the auxiliary power supply connector 31 of the auxiliary fuse unit 3 and the power supply connector 11 of the nit body 2 overlap each other while being approximately in contact with each other.

Subsequently, a bolt (not shown in the figures) of the battery connection terminal (not shown in the figures) is inserted into the both bolt insertion holes 31a and 11a, and then fastened by a nut (not shown in the figures).

As the final step, the battery connection terminal (not shown in the figures) is connected to the battery post (not shown in the figures) of the battery (not shown in the figures). The fuse unit 1 is fixed to the battery (not shown in the figures) to be positioned along the upper surface and the side surface of the battery (not shown in the figures). Accordingly, a new circuit is added to the fuse unit 1 by use of the auxiliary bus bar 30 of the auxiliary fuse unit 3.

As described above, the fuse unit 1 includes the unit body 2 including the bus bar 10 provided with the power supply connector 11, the first output connectors 12 and the second output connectors (not shown in the figures) and the fusible member (not shown in the figures), and the insulation protector 20 provided on the periphery of the bus bar 10. The auxiliary fuse unit 3 including the auxiliary bus bar 30 provided with the auxiliary power supply connector 31 and the auxiliary output connector 33 can be installed to the unit body 2. Therefore, in a case where a new circuit to be connected to the fuse unit 1 is added due to changes in vehicular conditions, the new circuit can be added by the installation of the auxiliary fuse unit 3 to the unit body 2. Accordingly, the fuse unit 1 can deal with the increase in circuits without preparing a new mold.

The auxiliary fuse unit 3 is installed to the unit body 2 in such a manner that the power supply connector 11 and the auxiliary power supply connector 31 are fastened together, and the respective fitting portions 22 and 44 of the unit body 2 and the auxiliary fuse unit 3 are fitted together. Therefore, the auxiliary fuse unit 3 is fixed to the unit body 2 tightly by the above-described mutual fastening and fitting and thus, oscillation of the unit body 2 and the auxiliary fuse unit 3 can surely be prevented. As a result, durability as a whole is also improved.

The fitting portion 22 of the unit body 2 is provided with the protrusions 22a for heat release, and the fitting portion 44 of the auxiliary fuse unit 3 is provided with the concave portions 44a into which the protrusions 22a are to be inserted. Therefore, the protrusions 22a for heat release are effectively utilized. In addition, since the protrusions 22a for heat release are inserted into the concave portions 44a of the auxiliary fuse unit 3, the installation space of the auxiliary fuse unit 3 can be minimized.

The unit body 2 is fixed to the battery (not shown in the figures) along the upper surface and the side surface of the battery, and the auxiliary fuse unit 3 is installed on the upper surface of the unit body 2. Therefore, an available upper space of the fuse unit 1 directly fixed to the battery can be utilized effectively.

The auxiliary bus bar 30 of the auxiliary fuse unit 3 is thinner than the bus bar 10 of the unit body 2. Therefore, a circuit having a smaller rating provided in the auxiliary bus bar 30 than that in the bus bar 10 of the unit body 2 is not required to be formed into a fine and complex bus bar shape. In other words, in a case where a new circuit to be connected to the fuse unit 1 is added due to changes in vehicular conditions and the circuit has a small rating, if the new circuit is added by utilizing the thicker bus bar 10 in the unit body 2, the bus bar 10 inevitably has a fine and complex configuration at an area where the new circuit is added to the bus bar 10. However, the present invention can prevent such a problem.

The auxiliary fuse unit 3 includes the protrusions 43 for heat release. Therefore, deterioration in heat releasing property can be minimized.

The fuse 46 is detachably installed in the auxiliary fuse unit 3. Therefore, the fuse 46 can be easily exchanged.

What is claimed is:

1. A fuse unit comprising:
    a unit body comprising:
        a bus bar provided with a power supply connector, an output connector and a fusible member, wherein the power supply connector comprises a first hole; and
        an insulation protector provided on a periphery of the bus bar; and
    an auxiliary fuse unit including an auxiliary bus bar provided with an auxiliary power supply connector and an auxiliary output connector and detachably installed to the unit body, wherein the auxiliary power supply connector comprises a second hole;
    wherein the auxiliary fuse unit is installed to the unit body in such a manner that the first hole of the power supply connector overlaps with the second hole of the auxiliary power supply connector, the power supply connector and the auxiliary power supply connector are in contact with each other, and respective fitting portions of the unit body and the auxiliary fuse unit are in contact with each other,
    wherein the fitting portion of the unit body is provided with protrusions for heat release and the fitting portion of the auxiliary fuse unit is provided with concave portions into which the protrusions are inserted, and
    wherein the unit body is fixed to a battery along an upper surface and a side surface of the battery, and the auxiliary fuse unit is installed on an upper surface of the unit body.

2. A fuse unit, comprising:
    a unit body comprising:
        a bus bar provided with a power supply connector, an output connector and a fusible member, wherein the power supply connector comprises a first hole; and
        an insulation protector provided on a periphery of the bus bar; and
    an auxiliary fuse unit including an auxiliary bus bar provided with an auxiliary power supply connector and an auxiliary output connector and detachably installed to the unit body, wherein the auxiliary power supply connector comprises a second hole;
    wherein the auxiliary fuse unit is installed to the unit body in such a manner that the first hole of the power supply connector overlaps with the second hole of the auxiliary power supply connector, the power supply connector and the auxiliary power supply connector are in contact with each other, and respective fitting portions of the unit body and the auxiliary fuse unit are in contact with each other,
    wherein the fitting portion of the unit body is provided with protrusions for heat release and the fitting portion of the auxiliary fuse unit is provided with concave portions into which the protrusions are inserted, and
    wherein the output connector has at least two insertion holes and the auxiliary fuse unit is installed in between the at least two insertion holes.

* * * * *